United States Patent [19]
Sugimoto et al.

[11] Patent Number: 5,842,755
[45] Date of Patent: Dec. 1, 1998

[54] BRAKING FORCE CONTROL SYSTEM IN VEHICLE

[75] Inventors: Yoichi Sugimoto; Yoshihiro Urai; Hideki Kubonoya, all of Wako, Japan

[73] Assignee: Honda Giken Kogyo Kabushiki Kaisha, Tokyo, Japan

[21] Appl. No.: 749,693

[22] Filed: Nov. 15, 1996

[30] Foreign Application Priority Data

Nov. 17, 1995 [JP] Japan .................................. 7-299555

[51] Int. Cl.$^6$ ...................................................... B60T 8/34
[52] U.S. Cl. ........................................ 303/186; 303/113.5
[58] Field of Search .................................. 303/9.62, 186, 303/188, 113.5, 189

[56] References Cited

U.S. PATENT DOCUMENTS 5,547,264   8/1996   Tozu et al. .............................. 303/9.62

FOREIGN PATENT DOCUMENTS 6-144178   5/1994   Japan .

Primary Examiner—Lee W. Young
Attorney, Agent, or Firm—Nikaido, Marmelstein, Murray & Oram LLP

[57] ABSTRACT

A braking force control system in a vehicle includes rotational speed sensors for detecting rotational speeds of front wheels and rear wheels, respectively, and braking force regulating devices capable of individually regulating braking forces for the front and rear wheels. In the braking force control system, the following two controls (1) and (2) are carried out: a front/rear braking force distribution control (1) for controlling the distribution of braking forces to front and rear wheel sides, such that a difference between front and rear wheel speeds is equalized to a target value; and an antilock brake control (2) for determining wheel locking tendencies individually in the front wheel side and the rear wheel side and controlling the braking force for the wheel determined to be in the locking tendency. When the antilock brake control is started in one of the front wheel side and the rear wheel side during execution of the front/rear braking force distribution control, the braking force distribution control is discontinued in the other of the front wheel side and the rear wheel side to increase the braking force of the other side at a defined increase rate. Thus, both of the braking force distribution control and the antilock control are feasible together and moreover, the switching-over between these controls can be smoothly achieved.

2 Claims, 6 Drawing Sheets

BRAKING FORCE CONTROL SYSTEM IN VEHICLE

BACKGROUND OF THE INVENTION

1. Field of the Invention

The present invention relates to a braking force control system in a vehicle, including rotational speed sensors for detecting rotational speeds of front wheels and rear wheels, respectively, and braking force regulating means capable of individually regulating braking forces for the front and rear wheels.

2. Description of the Related Art

A braking force distribution control system is already known, for example, from Japanese Patent Application Laid-open No.6-144178, which is designed to control the braking forces for the front and rear wheels, such that the rotational speeds of the front and rear wheels are compared with each other and equalized to each other. This braking force distribution control system is based on the fact that in a range of small tire slip rate, the braking force is substantially proportional to the slip rate, and the gradient of the braking force depends upon the wheel load. More specifically, when the rear wheel speeds are lower than the front wheel speeds, the increase in braking force for the rear wheels is suppressed. On the other hand, when the rear wheel speeds are higher than the front wheel speeds, the front/rear braking force distribution is controlled to approach a braking force distribution (a so-called ideal braking force distribution) proportional to the dynamic axle load in such a manner than the braking force for the rear wheels is increased.

The braking force distribution control system disclosed in the above-identified patent publication includes braking force regulating means individually corresponding to wheel brakes, such that an antilock brake control can be conducted using the braking force regulating means as they are. That is, a braking force distribution and antilock brake control system can be constructed at an inexpensive cost only by adding an antilock brake control function to a controller for controlling the braking force regulating means without addition of new parts or components to the braking force distribution control system.

When the braking force distribution and antilock brake control system is constructed in the above manner, the antilock brake control is started even during the braking force distribution control, if the braking force is increased, resulting in a road surface grip force (a friction force) of a tire reaching a limit. In this case, ideally, the grip forces of the tires of the front and rear wheels must simultaneously reach the limits, resulting in switching-over from the braking force distribution control to the antilock brake control. In practice, however, the control is switched over such that one of the front wheel side and the rear wheel side is subjected to the antilock brake control earlier than the other due to a control error, a non-linearity of a tire load characteristic and/or the like.

Figure 6:
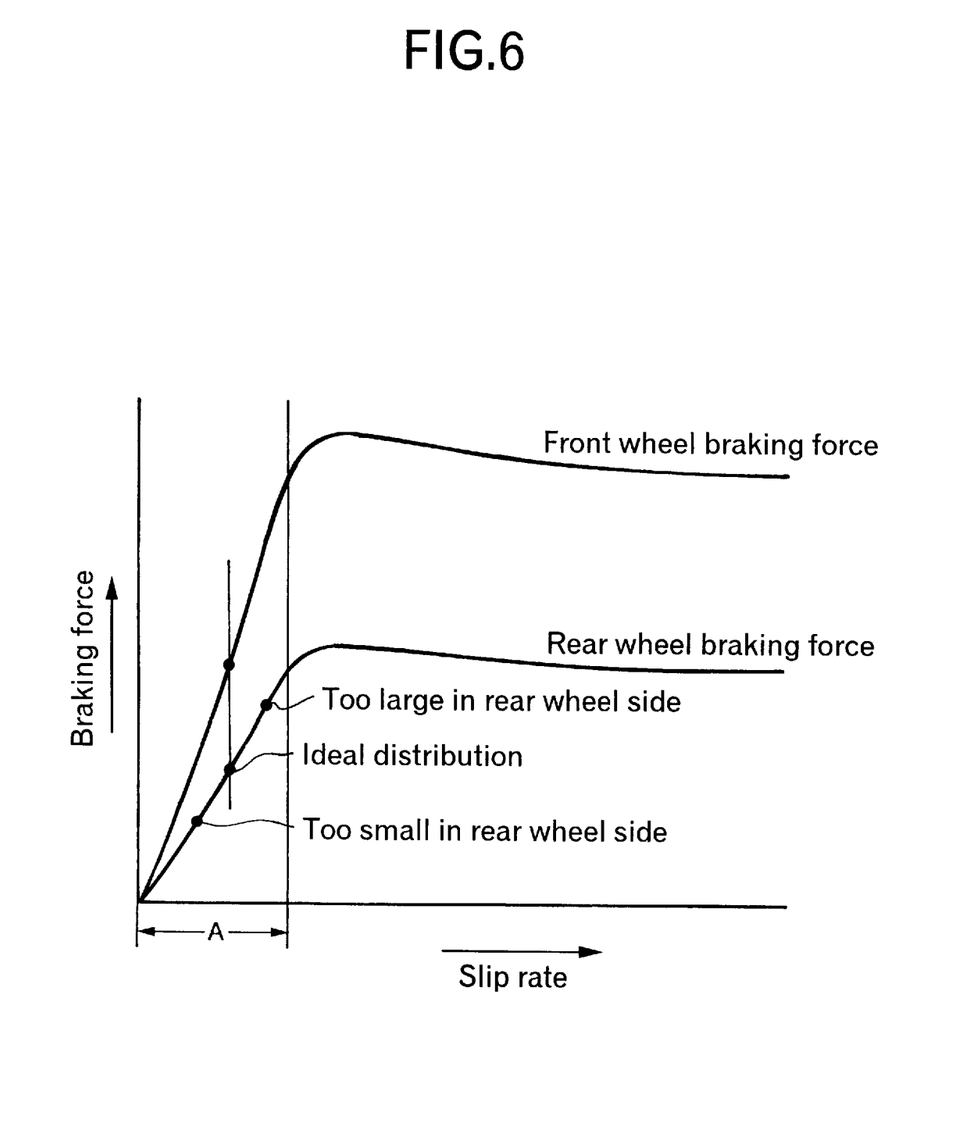
FIG. 6 shows the relationship between the slip rate and the braking forces for front and rear wheels.

However, if the antilock brake control is started in either one of the front wheel side and the rear wheel side earlier than the other, the wheel speeds are largely varied in the antilock brake control, and the generated slip rate largely exceeds a range A in FIG. 6. Therefore, the braking force distribution control is no longer feasible in the other of the front wheel side and the rear wheel side.

SUMMARY OF THE INVENTION

Accordingly, it is an object of the present invention to provide a braking force control system in a vehicle, wherein both of the braking force distribution control and the antilock brake control are feasible together and moreover, the switching-over between these controls can be smoothly achieved.

To achieve the above object, according to the present invention, there is provided a braking force control system in a vehicle, comprising rotational speed sensors for detecting rotational speeds of front wheels and rear wheels, respectively, and braking force regulating means capable of individually regulating braking forces for the front and rear wheels, wherein the braking force control system further includes a controller which controls operations of the braking force regulating means in a manner that the following two controls (1) and (2) are carried out: a front/rear braking force distribution control (1) for controlling the distribution of braking forces to front and rear wheel sides, such that a difference between front and rear wheel speeds is equalized to a target value, based on detection values detected by the rotational speed sensors; and an antilock brake control (2) for determining wheel locking tendencies individually in the front wheel side and the rear wheel side based on the detection values detected by the rotational speed sensors, and controlling the braking force for the wheel which is determined to be in the locking tendency, and when the antilock brake control is started in one of the front wheel side and the rear wheel side during execution of the front/rear braking force distribution control, the braking force distribution control is discontinued in the other of the front wheel side and the rear wheel side to increase the braking force on said other side at a predetermined increase rate.

With such arrangement, both of the braking force distribution control and the antilock brake control are feasible together and moreover, these controls can be smoothly switched over from one to another.

The above and other objects, features and advantages of the invention will become apparent from the following description of a preferred embodiment take in conjunction with the accompanying drawings.

DETAILED DESCRIPTION OF THE PREFERRED EMBODIMENT

The present invention will now be described by way of preferred embodiments with reference to the accompanying drawings.

Figure 1:
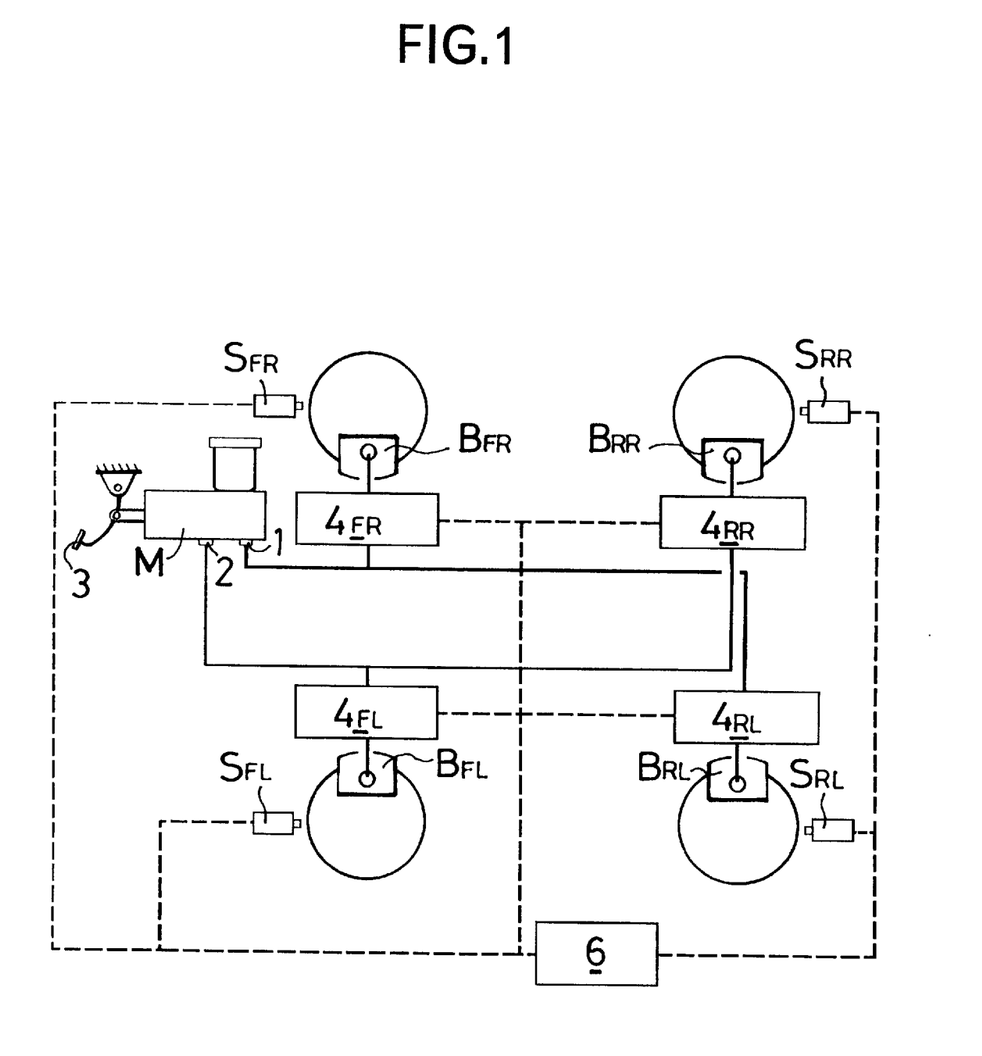
FIG. 1 is an diagrammatic illustration of a liquidpressure circuit of a brake device according to an embodiment of the present invention.

Referring first to FIG. 1, a brake pedal 3 is operatively connected to a tandem type master cylinder M which includes first and second output ports 1 and 2, such that independent braking liquid pressures are outputted through the first and second output ports 1 and 2 of the master cylinder M in response to the depression of the brake pedal 3. The first output port 1 is connected to a right front wheel brake $B_{FR}$ mounted on a right front wheel through a right front wheel braking force regulating means $4_{FR}$ and also to a left rear wheel brake $B_{RL}$ mounted on a left rear wheel through a left rear wheel braking force regulating means $4_{RL}$. The second output port 2 is connected to a left front wheel brake $B_{FL}$ mounted on a left front wheel through a left front wheel braking force regulating means 4FL and also to a right rear wheel brake $B_{RR}$ mounted on a right rear wheel through a right rear wheel braking force regulating means $4_{RR}$. Each of the wheel brakes $B_{FL}$, $B_{FR}$, $B_{RL}$ and $B_{RR}$ exhibits a braking force corresponding to a braking liquid pressure applied thereto, and for example, is a disk brake.

Rotational speeds of the left and right front wheels are detected by left and right front wheel rotational speed sensors $S_{FL}$ and $S_{FR}$, respectively, and rotational speeds of the left and right rear wheels are detected by left and right rear wheel rotational speed sensors $S_{RL}$ and $S_{RR}$, respectively. Detection values detected by the rotational speed sensors $S_{FL}$, $S_{FR}$, $S_{RL}$ and $S_{RR}$ are inputted to a controller 6. The controller 6 controls the operations of the braking force regulating means $4_{FL}$, $4_{FR}$, $4_{RL}$ and $4_{RR}$ based on the detection values detected by the rotational speed sensors $S_{FL}$, $S_{FR}$, $S_{RL}$ and $S_{RR}$.

Figure 2:
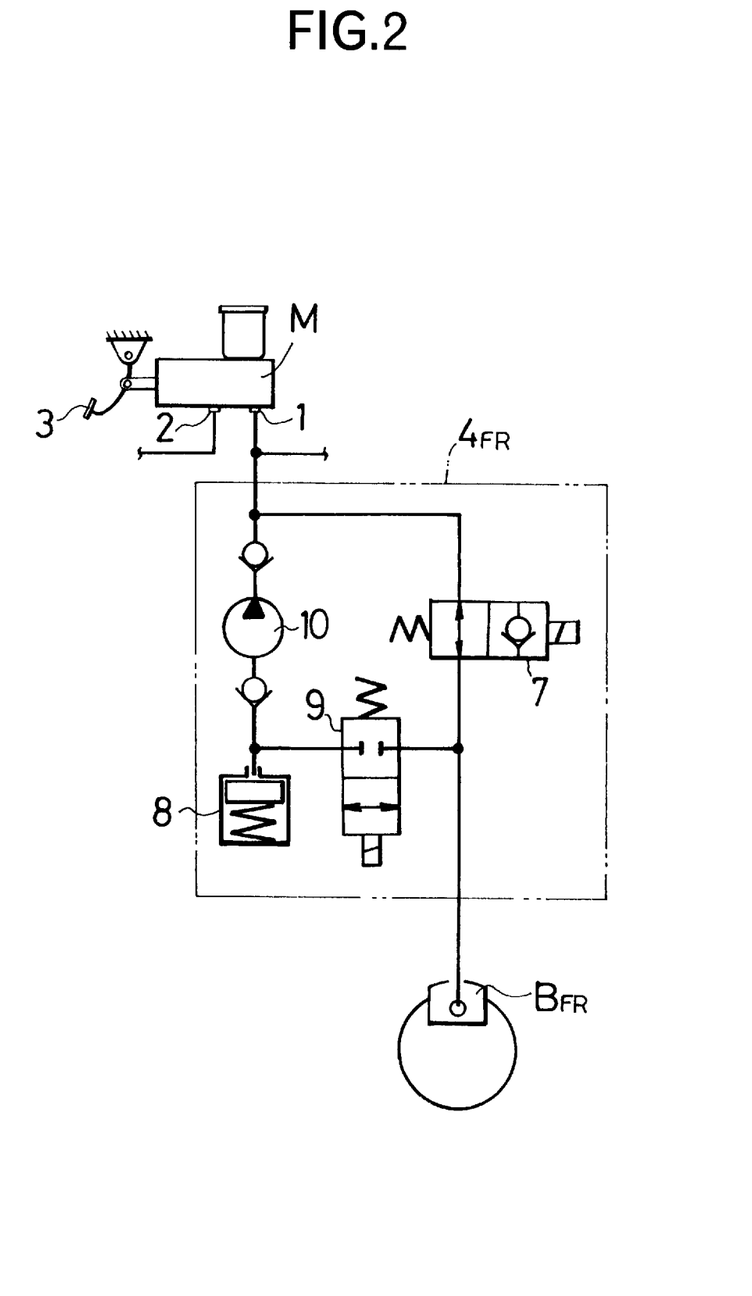
FIG. 2 is an illustration of the arrangement of braking force regulating means.

Referring to FIG. 2, the right front wheel braking force regulating means $4_{FR}$ includes a normally-opened solenoid valve 7 mounted between the first output port 1 of the master cylinder M and the right front wheel brake $B_{FR}$, a reservoir 8, a normally-closed solenoid valve 9 mounted between the right front wheel brake $B_{FR}$ and the reservoir 8, and a return pump 10 having an intake port connected to the reservoir 8 and an discharge port connected between the first output port 1 and the normally-opened solenoid valve 7.

The normally-opened solenoid valve 7 is capable of being switched over between a state in which it permits the first output port 1 and the right front wheel brake BFR to be put into communication with each other upon deenergization thereof, and a state in which it blocks the application of a liquid pressure from the first output port 1 to the right front wheel brake $B_{FR}$, but permits a braking liquid to flow from the right front wheel brake $B_{FR}$ upon energization thereof. The normally-closed solenoid valve 9 is capable of being switched over between a state in which it permits the right front wheel brake $B_{FR}$ and the reservoir 8 to be put out of communication with each other upon deenergization thereof, and a state in which it the right front wheel brake $B_{FR}$ and the reservoir 8 to be put into communication with each other upon energization thereof.

The left front wheel braking force regulating means $4_{FL}$, the left rear wheel braking force regulating means $4_{RL}$ and the right rear wheel braking force regulating means $4_{RR}$ are constructed in the same manner as the right front wheel braking force regulating means $4_{FR}$.

The operations of the normally-opened solenoid valve 7, the normally-closed solenoid valve 9 and the return pump 10 in each of the braking force regulating means $4_{FL}$, $4_{FR}$, $4_{RL}$ and $4_{RR}$ are controlled by the controller 6. The controller 6 controls the front/rear braking force distribution according to a procedure shown in FIG. 3, based on the detection values detected by the rotational speed sensors $S_{FL}$, $S_{FR}$, $S_{RL}$ and $S_{RR}$. In the embodiment, however, in carrying out the front/rear braking force distribution control, the braking forces of the left and right rear wheel brakes $B_{RL}$ and $B_{RR}$ are controlled, and during the front/rear braking force distribution control, the controller 6 controls the operations of the braking force regulating means $4_{RL}$ and $4_{RR}$ corresponding to the left and right rear wheel brakes $B_{RL}$ and $B_{RR}$.

Figure 3:
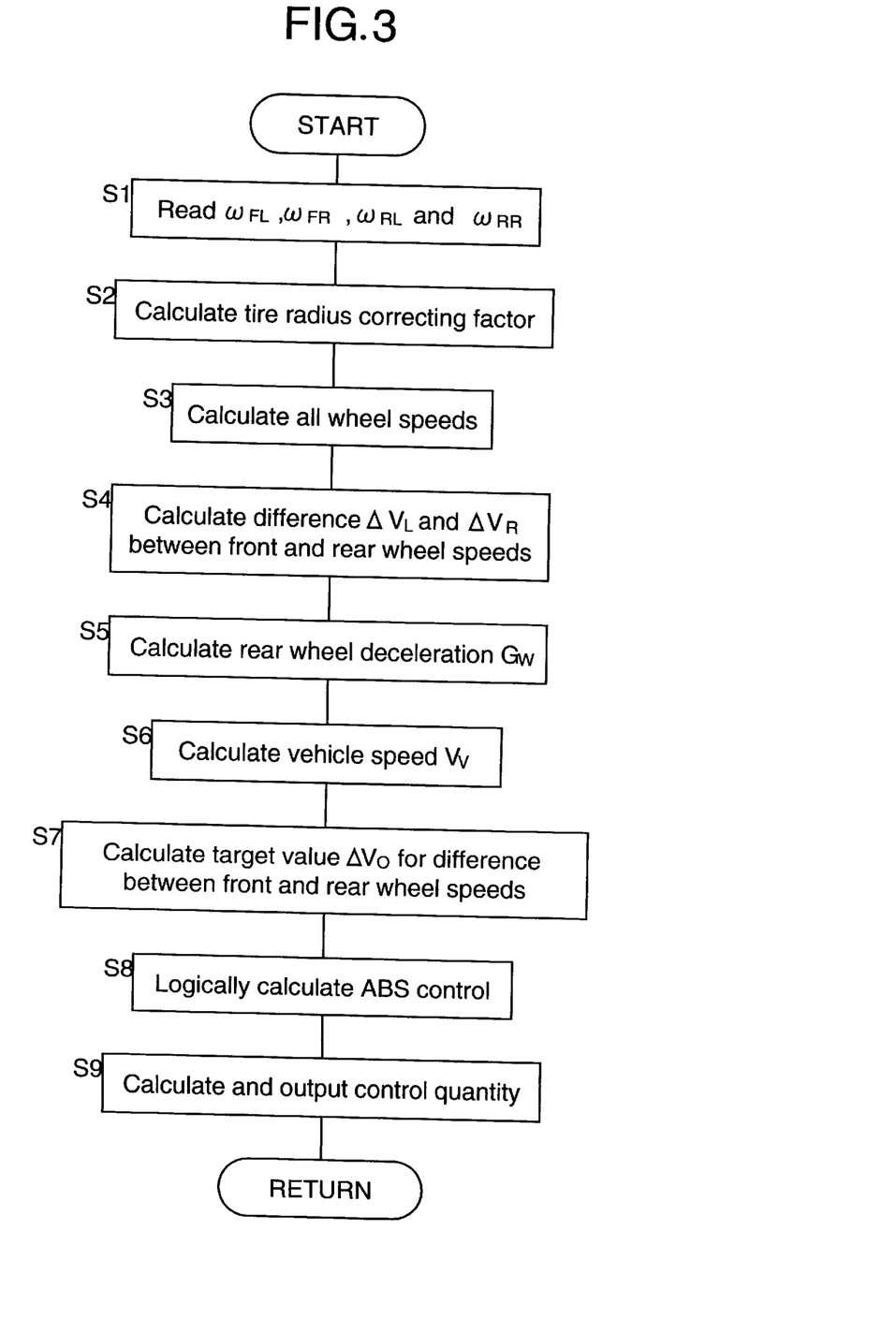
FIG. 3 is a flowchart showing a procedure for a braking force distribution control.

At first step S1 in FIG. 3, left and right front wheel rotational speeds $\omega_{FL}$ and $\omega_{FR}$ and left and right rear wheel rotational speeds $\omega_{RL}$ and $\omega_{RR}$ are read from the rotational speed sensors $S_{FL}$, $S_{FR}$, $S_{RL}$ and $S_{RR}$. At second step S2, a tire radius correcting factor is calculated. More specifically, the correcting factor for correcting a variation in tire radius is calculated by comparing the rotational speeds $\omega_{FL}$, $\omega_{FR}$, $\omega_{RL}$ and $\omega_{RR}$ at the time when the vehicle is traveling at a constant speed.

At third step S3, wheel speeds of all the wheels $W_{FL}$, $W_{FR}$, $W_{RL}$ and $W_{RR}$ are calculated. More specifically, a left front wheel speed $V_{WFL}$, a right front wheel speed $V_{WFR}$, a left rear wheel speed $V_{WRL}$ and a right rear wheel speed $V_{WRR}$ are calculated according to the following equations, respectively:

$$V_{WFL} = \gamma_{FL} \times \omega_{FL}$$

$$V_{WFR} = \gamma_{FR} \times \omega_{FR}$$

$$V_{WRL} = \gamma_{RL} \times \omega_{RL}$$

$$V_{WRR} = \gamma_{RR} \times \omega_{RR}$$

wherein $\gamma_{FL}$, $\gamma_{FR}$, $\gamma_{RL}$ and $\gamma_{RR}$ are dynamic radii of tires of the wheels $W_{FL}$, $W_{FR}$, $W_{RL}$ and $W_{RR}$ resulting from the correction of preset values of tire dynamic radii by the correcting factor calculated at second step.

At fourth step S4, a difference $\Delta V_L$ between the left front and rear wheel speeds and a difference $\Delta V_R$ between the right front and rear wheel speeds are calculated according to the following equations, respectively:

$$\Delta V_L = V_{WRL} - V_{WFL}$$

$$\Delta V_R = V_{WRR} - V_{WFR}$$

At fifth step S5, a rear wheel deceleration $G_W$ is determined from amounts of variation in rear wheel speeds $V_{WRL}$ and $V_{WRR}$ in any calculation cycle. At sixth step S6, a vehicle speed $V_v$ is calculated according to $\{(V_{WRL} + V_{WRR})/2\}$.

At seventh step S7, a target value for the difference between the front and rear wheel speeds is calculated according to the following equation:

$$\Delta V_0 = \lambda \times V_v - d$$

wherein each of $\lambda$ and d is a given value. As the target value for the difference between the front and rear wheel speeds is set at a larger value, the braking force distribution control is carried out to provide a higher wheel speed to the rear wheels, i.e., to provide a larger braking force to the front wheels.

At eighth step S8, a logical operation for an antilock brake control (which will be referred to as ABS control hereinafter) based on the wheel speeds $V_{WFL}$, $V_{WFR}$, $V_{WRL}$ and $V_{WRR}$ is carried out. In other words, the logical operation for determining locking tendencies of the wheels individually in the front wheel side and the rear wheel side is carried out. If it is determined that the ABS control is required in either the left or right front wheel side, a flag F is determined at "1". The ABS control logic is already known and hence, the detail thereof is not described herein. In the subsequent description, only the control of the left and right rear wheel brakes $B_{RL}$ and $B_{RR}$ subjected to the front/rear braking force distribution control will be described.

Then, at ninth step S9, the calculation of control quantities for the braking force regulating means $4_{RL}$ and $4_{RR}$ is carried out in order to regulate the braking forces of the left and right rear wheel brakes $B_{RL}$ and $B_{RR}$ in carrying out the front/rear braking force distribution control and the antilock brake control. In the processing at ninth step S9, the following seven control modes are switched over: a control stopping mode; a distribution control maintaining mode, a distribution control pressure increasing mode; a defined pressure increasing mode; an ABS control pressure reducing mode; an ABS control maintaining mode; and an ABS control pressure-increase mode. In the control stopping mode, indicates a state in which the control of the braking force regulating means $4_{RL}$, and $4_{RR}$ is stopped, i.e., a mode for applying the braking pressure from the master cylinder to the left and right rear wheel brakes $B_{RL}$ and $B_{RR}$. The distribution control maintaining mode indicates a mode for maintaining the braking liquid pressures for the left and right rear wheel brakes $B_{RL}$ and $B_{RR}$ by closing the normally-opened solenoid valves 7 of the braking force regulating means $4_{RL}$ and $4_{RR}$ so as to inhibit the application of the liquid pressure from the master cylinder M to the left and right rear wheel brakes $B_{RL}$ and $B_{RR}$. When the control mode is switched over to the distribution control maintaining mode upon an increase in output braking liquid pressure from the master cylinder M, the braking liquid pressures for the left and right front wheel brakes $B_{FL}$ and $B_{FR}$ are increased, while the braking liquid pressures for the left and right rear wheel brakes $B_{RL}$ and $B_{RR}$ are maintained, thereby decreasing the ratio of distribution of the braking liquid pressures to the left and right rear wheel brakes $B_{RL}$ and $B_{RR}$. The distribution control pressure increasing mode is a mode for slowly increasing the braking forces of the left and right rear wheel brakes $B_{RL}$ and $B_{RR}$ at a certain gradient by repeating the deenergization and energization of the normally-opened solenoid valves 7 in the braking force regulating means $4_{RL}$ and $4_{RR}$ in a short cycle and gradually transmitting the braking liquid pressure from the master cylinder M to the left and right rear wheel brakes $B_{RL}$ and $B_{RR}$. The gradient is set by a PID calculation based on a difference between $\Delta V_L$ or $\Delta V_R$ and the target value $\Delta V_0$ of the difference between the front and rear wheel speeds. The defined pressure increasing mode is a mode for slowly increasing the braking pressure for the left and right rear wheel brakes $B_{RL}$ and $B_{RR}$ at a certain gradient by repeating the deenergization and energization of the normally-opened solenoid valves 7 in the braking force regulating means $4_{RL}$ and $4_{RR}$ in a short cycle and gradually transmitting the braking liquid pressure from the master cylinder M to the left and right rear wheel brakes $B_{RL}$ and $B_{RR}$. The gradient is previously defined. The ABS control pressure increasing mode is a mode for maintaining the braking liquid pressure for the left and right rear wheel brakes $B_{RL}$ and $B_{RR}$ by closing the normally-opened solenoid valves 7 in the braking force regulating means $4_{RL}$ and $4_{RR}$ in the antilock brake control to inhibit the application of the liquid pressure from the master cylinder. The ABS control pressure increasing mode is a mode for increasing the braking pressures for the left and right rear wheel brakes $B_{RL}$ and $B_{RR}$ by repeating the deenergization and energization of the normally-opened solenoid valves 7 in the braking force regulating means $4_{RL}$ and $4_{RR}$ in a short cycle and gradually transmitting the braking liquid pressure from the master cylinder M.

Figure 4:
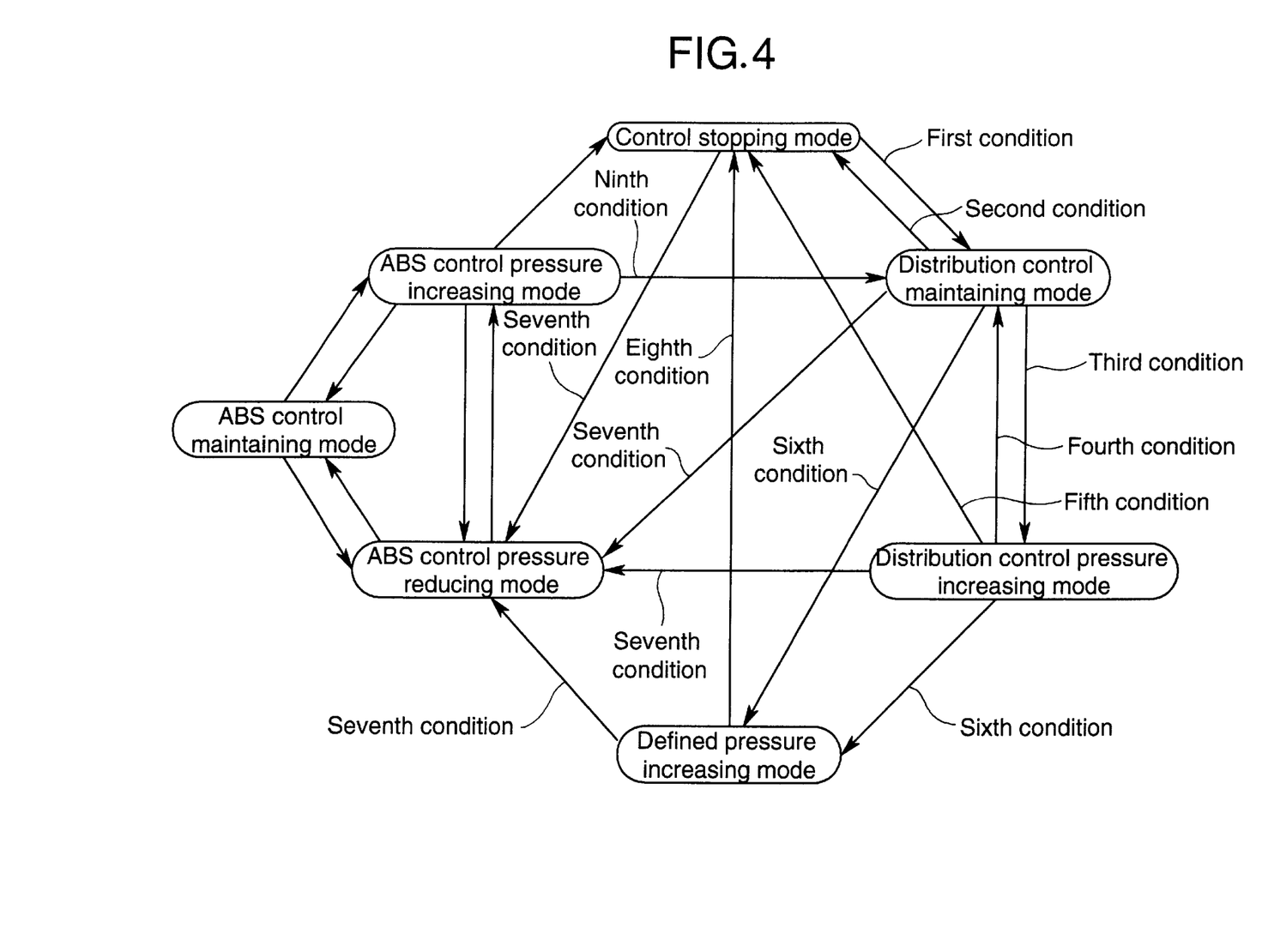
FIG. 4 shows the interrelation between the braking force distribution control mode and the antilock brake control mode.

The control mode is switched over from the control stopping mode to the distribution control maintaining mode by the establishment of a first condition. The first condition indicates that $\Delta V_L$ (or $\Delta V_R$) $<\Delta V_0$ and the rear wheel deceleration $G_W$ exceeds a first preset value $G_1$ (e.g., 0.4 g), or the rear wheel deceleration $G_W$ exceeds a second preset value $G_2$ larger than the first preset value $G_1$ (e.g., 0.6 g). Thus, when the rear wheel deceleration $G_W$ exceeds the first preset value $G_1$, and there is a deviation produced between the difference $\Delta V_L$, $\Delta V_R$ between the wheel speed $V_{WFL}$, $V_{WFR}$ of the front wheel $W_{FL}$, $W_{FR}$ and the wheel speed $V_{WRL}$, $V_{WRR}$ of the rear wheel $W_{RL}$, $W_{RR}$ and the wheel speed difference target value $\Delta V_0$, or when the rear wheel deceleration $G_W$ exceeds the second preset value $G_2$ irrespective of the difference $\Delta V_L$, $\Delta V_R$ between the wheel speed $V_{WFL}$, $V_{WFR}$ of the front wheel $W_{FL}$, $W_{FR}$ and the wheel speed $V_{WRL}$, $V_{WRR}$ of the rear wheel $W_{RL}$, $W_{RR}$, the control of the front/rear braking force distribution is started. Thus, it is possible to inhibit the excessive (too large) distribution of the braking force to the rear wheels.

The control mode is switched over from the distribution control maintaining mode to the control stopping mode by the establishment of a second condition. The second condition indicates that the brake operating force has been relaxed, for example, that the rear wheel deceleration $G_W$ is equal to or smaller than a certain value (e.g., 0.2 g), or a brake lamp signal is turned off, or the vehicle speed $V_V$ is reduced to about 5 km/hr or less, resulting in the vehicle being substantially stopped.

The control mode is switched over from the distribution control maintaining mode to the distribution control pressure increasing mode by the establishment of a third condition. The third condition indicates that $\Delta V_L$ (or $\Delta V_R$)>$\Delta V_1$ and the rear wheel deceleration $G_W$ is equal to or larger than a certain value (e.g., 0.3 g), wherein $\Delta V_1$ is a value provided by addition of a small value (e.g., 0.3 km/hr) to the wheel speed difference target value $\Delta V_0$, i.e., by providing the wheel speed difference target value $\Delta V_0$ with a hysteresis in order to avoid the fact that the control is hypersensitive. Thus, when the distribution of the braking force to the front wheels is larger than that to the rear wheels as a result of maintaining of the rear wheel braking liquid pressure, the distribution can be corrected to a proper distribution by gradually increasing the rear wheel braking liquid pressure.

The control mode is switched over from the distribution control pressure increasing mode to the distribution control maintaining mode by the establishment of a fourth condition. The fourth condition indicates that $\Delta V_L$ (or $\Delta V_R$)>$\Delta V_0$, or the rear wheel deceleration $G_W$, is equal to or smaller than a certain value (e.g., 0.2 g). Thus, the braking liquid pressure for the left and right wheel brakes $B_{RL}$ and $B_{RR}$ is maintained at a proper value.

The control mode is switched over from the distribution control pressure increasing mode to the control stopping mode by the establishment of a fifth condition. The fifth condition indicates that the distribution control pressure increasing mode is continued for 2 seconds or more. When the pressure-increasing time has been sufficiently continued to ensure that the braking liquid pressure for the left and right rear wheel brakes $B_{RL}$ and $B_{RR}$ is equal to the output liquid pressure from the master cylinder M, the unnecessary operation of the braking force regulating means $4_{RL}$ and $4_{RR}$ is inhibited.

The control mode is switched over from the distribution control maintaining mode or the distribution control pressure increasing mode to the defined pressure increasing mode by the establishment of a sixth condition. The sixth condition indicates that it is determined that the ABS control is required in either one of the left and right front wheel sides, and the flag F is brought into "1". Thus, in a state in which the front/rear braking force distribution control becomes unfeasible by subjecting either one of the left and right front wheel sides to the ABS control, the distribution control is discontinued, and the braking pressure for the left and right rear wheel brakes $B_{RL}$ and $B_{RR}$ is increased at a defined rate.

The control mode is switched over from the control stopping mode, the distribution control maintaining mode, the distribution control pressure increasing mode or the defined pressure increasing mode to the ABS control pressure reducing mode by the establishment of a seventh condition. The seventh condition indicates that there is a possibility of a wheel locking produced in the left and right rear wheels, and a pressure-reducing command has been provided by the ABS control logic.

The control mode is switched over from the defined pressure increasing mode to the control stopping mode by the establishment of an eighth condition. The eighth condition indicates that the defined pressure increasing mode has been continued for a certain time, e.g., 0.5 seconds or more. Thus, in a state in which the pressure increasing time has been sufficiently continued to ensure that the braking liquid pressure for the left and right wheel brakes $B_{RL}$ and $B_{RR}$ is equal to the output liquid pressure from the master cylinder M, the unnecessary operation of the braking force regulating means $4_{RL}$ and $4_{RR}$ can be inhibited.

The control mode is switched from the ABS control pressure increasing mode to the distribution control maintaining mode by the establishment of a ninth condition. The ninth condition indicates that in a state of the flag F=0, $\Delta V_L$ (or $\Delta V_R$)<$\Delta V_0$. Thus, when the ABS control of the left and right front wheels is finished, for example, by loosening the depression of the brake pedal 3 by a vehicle driver, the ABS control of the left and right rear wheels can be also returned to the front/rear braking force distribution control.

The description of conditions for switching over, from one to another, the ABS control pressure reducing mode, the ABS control pressure increasing mode and the ABS control maintaining mode and a condition for switching-over from the ABS control mode to the control stopping mode is omitted, because they are not related directly to the subject matter of the present invention.

Figure 5:
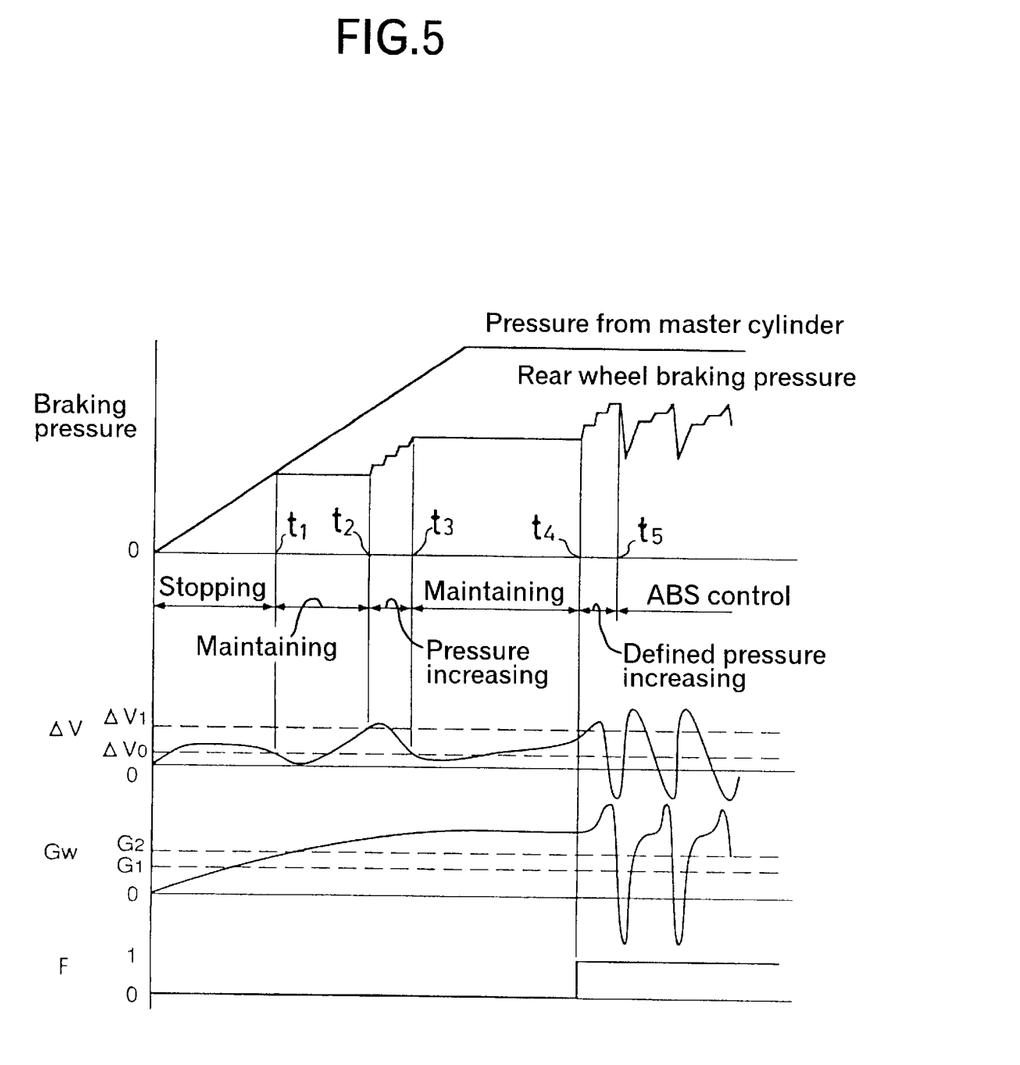
FIG. 5 is a timing chart for a braking force distribution and an antilock brake control.

The operation of the embodiment will be described below with reference to FIG. 5. At a time point $t_1$ when the rear wheel deceleration $G_W$ exceeds the first preset value $G_1$ to ensure that $\Delta V_L$ (or $\Delta V_R$)<$\Delta V_0$ in a course in which the output liquid pressure from the master cylinder M is being increased in response to the braking operation, the control mode is switched over from the control stopping mode to the distribution maintaining mode to ensure that the ratio of distribution of the braking liquid pressure to the left and right rear wheel brakes $B_{RL}$ and $B_{RR}$ is decreased as compared with the distribution of the braking liquid pressure to the left and right front wheel brakes $B_{FL}$ and $B_{FR}$, thereby suppressing the braking force in the rear wheel side.

At a time point $t_2$ when the third condition required for switching-over from the distribution control maintaining mode to the distribution control pressure increasing mode is established, i.e., when $\Delta V_L$ (or $\Delta V_R$)<$\Delta V_0$ and the rear wheel deceleration $G_W$ is equal to or larger than the certain value (e.g., 0.3 g), the control mode is switched over from the distribution control maintaining mode to the distribution control pressure increasing mode to ensure that the braking liquid pressure for the left and right rear wheel brakes $B_{RL}$ and $B_{RR}$ is gradually increased. Therefore, the braking force distribution to the front wheels becoming larger than that to the rear wheels as a result of the control in the distribution control maintaining mode is corrected to a proper distribution by increasing the braking liquid pressure for the left and right rear wheel brakes $B_{RL}$ and $B_{RR}$.

When at least one element of the fourth condition, e.g., $\Delta V_L$ (or $\Delta V_R$)<$\Delta V_0$ is established at a time point $t_3$ during execution of the control in the distribution control pressure increasing mode, the control mode is switched over again from the distribution control pressure increasing mode to the distribution control maintaining mode.

Further, when the flag F is brought into "1" in response to the start of the ABS control for the left and right front wheels at a time point $t_4$, the control mode is switched over from the distribution control maintaining mode to the defined pressure increasing mode, thereby operating the braking force regulating means $4_{RL}$ and $4_{RR}$, such that the braking force distribution control in the left and right rear wheel side is discontinued to increase the braking force at a defined increase rate.

Thereafter, when a pressure reducing command by the ABS control logic is provided at a time point $t_5$, the control mode is switched over to the ABS control pressure reducing mode and subsequently to the ABS control maintaining mode, the ABS control pressure increasing mode and the like.

By controlling the braking force regulating means $4_{FL}$, $4_{FR}$, $4_{RL}$ and $4_{RR}$ individually corresponding to the wheel brakes $B_{FL}$, $B_{FR}$, $B_{RL}$ and $B_{RR}$ in the above manner, the front/rear braking force distribution control and the antilock brake control can be carried out without addition of parts or components. Moreover, when the antilock brake control is started in the left and right front wheel side during continuation of the front/rear braking force distribution control, the braking force distribution control in the left and right rear wheel side is stopped to increase the braking force at the defined increase rate and hence, the switching-over between the front/rear braking force distribution control and the antilock brake control can be performed smoothly.

Although the embodiment of the present invention has been described in detail, it will be understood that the present invention is not limited to the above-described embodiment, and various modifications in design may be made without departing from the spirit and scope of the invention defined in claims.

For example, the X-arranged type brake device has been described in the embodiment, but the present invention is applicable to all arranged-types brake devices. In addition, the embodiment designed to control the left and right rear wheel braking force regulating means $4_{RL}$ and $4_{RR}$ to perform the front/rear braking force distribution control has been described, but the front/rear braking force distribution control can be performed by the left and right front wheel braking force regulating means $4_{FL}$ and $4_{FR}$. Further, the front/rear braking force distribution control can be performed using all of the braking force regulating means $4_{FL}$, $4_{FR}$, $4_{RL}$ and $4_{RR}$.

What is claimed is:

1. A braking force control system in a vehicle, comprising rotational speed sensors for detecting rotational speeds of front wheels and rear wheels, respectively, and braking force regulating means capable of individually regulating braking forces for the front and rear wheels, wherein said braking force control system further includes a controller which controls operations of said braking force regulating means in a manner that the following two controls (1) and (2) are carried out: a front/rear braking force distribution control (1) for controlling the distribution of braking forces to front and rear wheel sides, such that a difference between front and rear wheel speeds is equalized to a target value, based on detection values detected by said rotational speed sensors; and an antilock brake control (2) for determining wheel locking tendencies individually in the front wheel side and the rear wheel side based on said detection values detected by said rotational speed sensors, and controlling the braking force for the wheel which is determined to be in the locking tendency, and when the antilock brake control is started in one of the front wheel side and the rear wheel side during execution of the front/rear braking force distribution control, the braking force distribution control is discontinued in the other of the front wheel side and the rear wheel side to increase the braking force of the other side at a predetermined increase rate.

2. A braking force control system in a vehicle, comprising rotational speed sensors for detecting rotational speeds of front and rear wheels, respectively, and braking force regulating means capable of individually regulating braking forces for the front and rear wheels, wherein said braking force control system further includes a controller which controls operations of said braking force regulating means in a manner that the following two controls (1) and (2) are carried out: a front/rear braking force distribution control (1) for controlling the distribution of braking forces to front and rear wheel sides, such that a difference between front and rear wheel speeds is equalized to a target value, based on detection values detected by said rotational speed sensors; and an antilock brake control (2) for determining wheel locking tendencies individually in the front wheel side and the rear wheel side based on said detection values detected by said rotational speed sensors, and controlling the braking force for the wheel which is determined to be in the locking tendency, and when the antilock brake control is started in one of the front wheel side and the rear wheel side during execution of the front/rear braking force distribution control, the braking force distribution control is discontinued in the other of the front wheel side and the rear wheel side to increase the braking force of the other side at a predetermined increase rate.

* * * * *